(12) United States Patent
Onda et al.

(10) Patent No.: US 10,391,862 B2
(45) Date of Patent: Aug. 27, 2019

(54) HEAD-UP DISPLAY COVER MEMBER AND DISPLAY DEVICE

(71) Applicant: DENSO CORPORATION, Kariya, Aichi-pref. (JP)

(72) Inventors: Kazuhisa Onda, Kariya (JP); Hiroshi Ando, Kariya (JP); Takashi Takazawa, Kariya (JP); Makoto Sakai, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/535,265

(22) PCT Filed: Dec. 11, 2015

(86) PCT No.: PCT/JP2015/006197
§ 371 (c)(1),
(2) Date: Jun. 12, 2017

(87) PCT Pub. No.: WO2016/098333
PCT Pub. Date: Jun. 23, 2016

(65) Prior Publication Data
US 2017/0329134 A1 Nov. 16, 2017

(30) Foreign Application Priority Data
Dec. 16, 2014 (JP) .................. 2014-254214

(51) Int. Cl.
*B60K 35/00* (2006.01)
*G02B 27/01* (2006.01)

(52) U.S. Cl.
CPC .......... *B60K 35/00* (2013.01); *G02B 27/0101* (2013.01); *G02B 27/0149* (2013.01); *B60K 2350/1072* (2013.01); *B60K 2350/2052* (2013.01); *B60K 2350/2065* (2013.01); *B60K 2350/2082* (2013.01);
(Continued)

(58) Field of Classification Search
CPC ............ G02B 27/0149; G02B 27/0101; G02B 2027/0118; G02B 2027/012; G02B 2027/014; G02B 2027/015; B60K 35/00; B60K 2350/1072; B60K 2350/2052;
(Continued)

(56) References Cited

U.S. PATENT DOCUMENTS

2002/0166273 A1* 11/2002 Nakamura ......... G02B 27/0101
40/593
2005/0154505 A1 7/2005 Nakamura et al.
(Continued)

FOREIGN PATENT DOCUMENTS

| JP | H02204714 A | 8/1990 |
| JP | 2006001377 A | 1/2006 |
| JP | 2013086691 A | 5/2013 |

*Primary Examiner* — George G King
(74) *Attorney, Agent, or Firm* — Harness, Dickey & Pierce, P.L.C.

(57) ABSTRACT

In a head-up display, a cover member includes a first transmissive member and a second transmissive member that transmit a light beam including an image generated by an image generation unit. The first transmissive member is formed to face upward from a front end to a rear end. Likewise, the second transmissive member is formed to face upward from a front end to a rear end. The rear end of the first transmissive member is offset to an upper side from the front end of the second transmissive member.

19 Claims, 9 Drawing Sheets

(52) U.S. Cl.
CPC ............... *B60K 2350/2086* (2013.01); *B60K 2350/921* (2013.01); *G02B 2027/012* (2013.01); *G02B 2027/014* (2013.01); *G02B 2027/015* (2013.01); *G02B 2027/0118* (2013.01)

(58) Field of Classification Search
CPC .... B60K 2350/2065; B60K 2350/2082; B60K 2350/2086; B60K 2350/921
USPC ........................................................ 359/894
See application file for complete search history.

(56) References Cited

U.S. PATENT DOCUMENTS

| | | | |
|---|---|---|---|
| 2008/0192358 A1* | 8/2008 | Watanabe .......... | G02B 27/0101 359/633 |
| 2014/0253821 A1 | 9/2014 | Takatoh et al. | |
| 2015/0332654 A1* | 11/2015 | Geloen ................ | G02B 27/01 345/697 |

* cited by examiner (a)

(b)

REFERENCE EXAMPLE

HEAD-UP DISPLAY COVER MEMBER AND DISPLAY DEVICE

CROSS REFERENCE TO RELATED APPLICATIONS

This application is a U.S. National Phase Application under 35 U.S.C. 371 of International Application No. PCT/JP2015/006197 filed on Dec. 11, 2015 and published in Japanese as WO 2016/098333 A1 on Jun. 23, 2016. This application is based on and claims the benefit of priority from Japanese patent application No. 2014-254214 filed on Dec. 16, 2014. The entire disclosures of all of the above applications are incorporated herein by reference.

TECHNICAL FIELD

The present disclosure relates to a head-up display cover member and a display device.

BACKGROUND ART

As the above head-up display, a head-up display which displays multiple images in an up-down direction of a visual line of a user (for example, refer to Patent Literature 1) has been known.

PRIOR ART LITERATURES

Patent Literature

Patent Literature 1: JP 2006-001377 A

SUMMARY OF INVENTION

Incidentally, in the above head-up display, in order to prevent dust, it is general to provide a cover member provided with a transmissive member that transmits light rays including an image. In the cover member, an angle is given to a reference plane such as a horizontal plane to some extent so as to restrain an external light from being reflected by a transmissive member to enter the user's visibility. For that reason, if it is attempted to dispose an image with a large viewing angle in an up-down direction of the visual line of the user as in Patent Literature 1, a height of a cover member may become large.

In view of the above, it is an object of the present disclosure to provide a head-up display cover member capable of suppressing a height of the cover member.

In a first aspect of the present disclosure, head-up display cover member that covers from an upper side an image generation unit for generating an image viewed as a virtual image on a front side of a user includes a first transmissive member that transmits a light beam including the image generated by the image generation unit, and a second transmissive member that is disposed on a rear side of the first transmissive member and transmits the light beam including the image generated by the image generation unit, where the first transmissive member is shaped to face upward from a front end to a rear end, the second transmissive member is shaped to face upward from a front end to a rear end, and an angle defined by a tangential plane at the rear end of the first transmissive member with respect to a front-rear direction is set to be larger than an angle defined by a tangential plane at the front end of the second transmissive member with respect to the front-rear direction, or the rear end of the first transmissive member is offset to an upper side of the front end of the second transmissive member.

According to the head-up display cover member according to a first aspect, the angle defined by a tangent plane at a rear end of the first transmissive member with respect to a front-rear direction is set to be larger than the angle defined by a tangent plane at a front end of the second transmissive member with respect to the front-rear direction, or the rear end of the first transmissive member is offset to the upper side on the front end of the second transmissive member. For that reason, a length (height) of the entire cover member in the up-down direction can be suppressed.

DESCRIPTION OF EMBODIMENTS

Hereinafter, multiple embodiments of the present disclosure will be described below in detail with reference to the drawings. First of all, in order to facilitate understanding of a technical significance of the present disclosure, a head-up display as a reference example will be described with reference to FIG. 15.

A head-up display according to a reference example includes a cover member having a light transmissive portion 45z. The light transmissive portion 45z of the cover member is configured so that the light transmissive portion 45z is curved upward toward a driver's viewpoint 25 side in order to reduce an influence of an external light.

In this example, if it is attempted to more increase a viewing angle α2 when viewing the image displayed on a windshield (combiner) 21 from the driver's viewpoint 25, there is a need to increase a length W2 of the light transmissive portion 45z in the horizontal direction. When the length W2 of the light transmissive portion 45z in the horizontal direction is thus increased, a height H2 of the light transmissive portion 45z also increases.

Also, when the height H2 of the light transmissive portion 45z is increased, an angle β2 defined between an image center and a lower end plane of the visual line becomes small, and the driver's field of vision is narrowed. Further, when the height H2 of the light transmissive portion 45z is increased, an angle θ2 at which a light beam from an HUD light source enters the light transmissive portion 45z is increased with the results that a light transmittance is reduced and a light utilization efficiency is lowered.

In view of the above circumstances, a head-up display cover member capable of preventing a height of the cover member from increasing will be described below with reference to multiple embodiments.

First Embodiment

Configuration of the Present Embodiment

Figure 1:
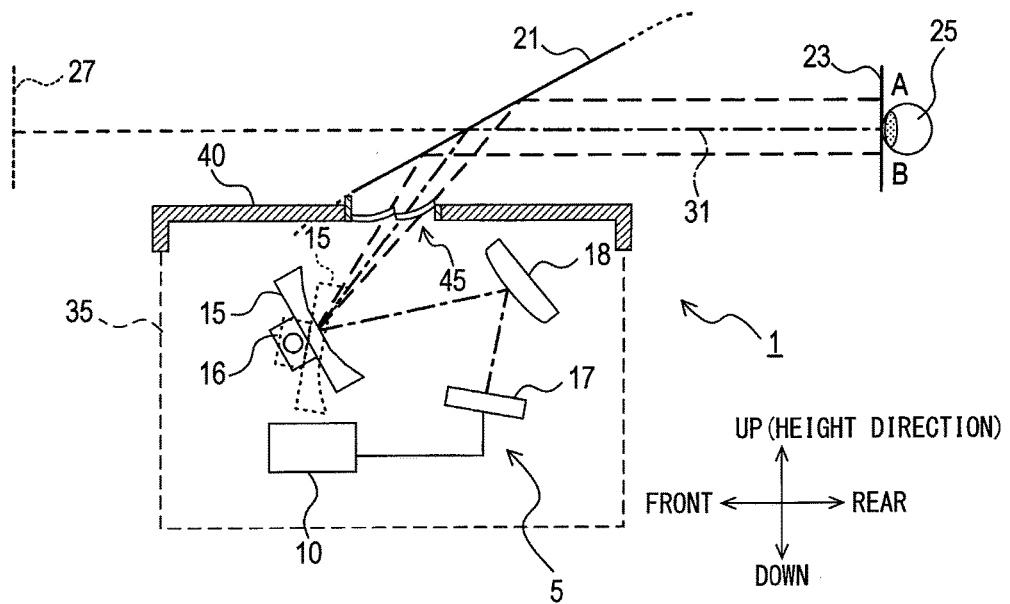
FIG. 1 is a side view schematically illustrating a head-up display.

A head-up display 1 according to a first embodiment is mounted on a vehicle (moving object) and, as illustrated in FIG. 1, includes an image generation controller 10, a concave mirror 15, a drive unit 16, a display unit 17, and a reflecting mirror 18. In this example, an optical axis 31 in FIG. 1 is, for example, a schematic optical axis illustrating a portion such as a center of an optical path of light displayed on the display unit 17.

The display unit 17 is configured as, for example, a liquid crystal display, and displays an image based on a command from the image generation controller 10. The image (display light) displayed on the display unit 17 is reflected and enlarged by the reflecting mirror 18 and the concave mirror 15 and is projected on a windshield 21 installed in a vehicle. Then, the image reaches the viewpoint 25 of a driver (user) located in an eye box 23 with the windshield 21 serving as a combiner. The driver can visually recognize the image displayed on the display unit 17 as a virtual image (virtual image display image) 27 at a point ahead of the windshield 21. In other words, the driver visually recognizes the virtual image 27 of the image generated by the image generation controller 10 on a front side of the driver himself.

As illustrated in FIG. 1, in the following description, it is assumed that the visual line direction of the driver is taken as a front side, and the opposite direction is taken as a rear side. In the present embodiment, it is assumed that a front-rear direction based on the visual line of the driver is substantially parallel to a horizontal direction and coincides with a front-rear direction of a traveling direction of an automobile. Further, it is assumed that an up-down direction orthogonal to the front-rear direction is substantially parallel to a vertical direction. In the following description, an upward direction is sometimes referred to as a height direction (refer to FIG. 1). However, the front-rear direction and the up-down direction are not limited to a horizontal direction and an up-down direction in a strict sense, respectively. The front-rear direction and the up-down direction may be inclined with respect to a horizontal direction and the up-down direction, respectively, as long as the head-up display cover member according to the present disclosure can be technically implemented and can exert the operational effect.

The eye box 23 is a region in which the driver can visually recognize the image, and a position of the eye box 23 is adjusted according to the image (a display region on a display screen of the image) displayed on the display unit 17 and an angle of the concave mirror 15. The angle of the concave mirror 15 is changed by driving the drive unit 16 configured by a combination of a motor such as a stepping motor with a gear driven by the motor.

For example, if the angle of the concave mirror 15 is changed slightly downward from a position indicated by a solid line in FIG. 1, the eye box 23 moves upward and can be allowed to correspond to the driver present at a position A where the viewpoint 25 is high. Further, for example, when the angle of the concave mirror 15 is changed slightly upward from the position indicated by the solid line in FIG. 1, the eye box 23 can be allowed to correspond to the driver present at a position B where the viewpoint 25 is low.

In this manner, the position of the eye box 23 can be changed according to the position (seating height) of the visual line of the driver.

In this example, the concave mirror 15, the drive unit 16, the display unit 17, and the reflecting mirror 18 configure an image generation unit 5 which is configured to form an image. The image generation unit 5 and the image generation controller 10 are accommodated in a housing 35 as indicated by a broken line in FIG. 1. The housing 35 is equipped with a cover member (a head-up display cover member) 40 that covers the image generation unit 5 and the image generation controller 10 from an upper side.

Figure 2:
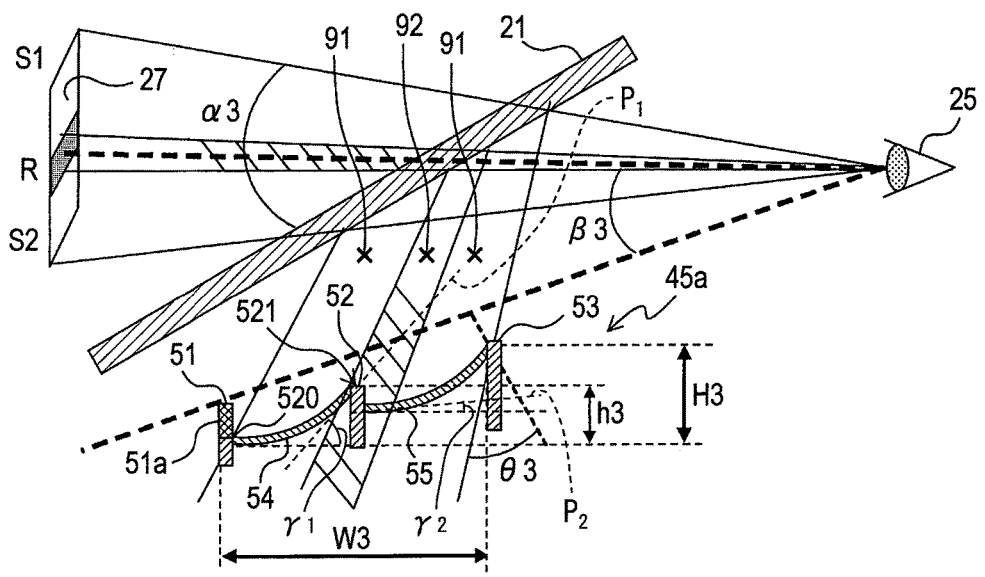
FIG. 2 is a side view of a head-up display including a light transmissive portion according to a first embodiment.

The cover member 40 is formed with an opening portion that opens in the up-down direction and a light transmissive portion 45 (45a) for transmitting a light beam including the image generated by the image generation unit 5 from an inside of the housing 35 to an outside of the housing 35 is disposed in the opening of the cover member 40. As illustrated in FIG. 2, the light transmissive portion 45a according to the present embodiment includes a first support member 51, a second support member 52, a third support member 53, a first transmissive member 54, and a second transmissive member 55.

The first and second transmissive members 54 and 55 are made of a transparent material such as acrylic or glass, for example, and have a transmissive region that allows the light beam including the image generated by the image generation unit 5 to pass through the first and second transmissive members 54 and 55. In the first and second transmissive members 54 and 55 according to the present embodiment, a substantially entire area is a transmissive region. The second transmissive member 55 is located on a rear side (a driver side) of the first transmissive member 54, and both of the first transmissive member 54 and the second transmissive member 55 are disposed side by side in the front-rear direction.

The first to third support members 51, 52, and 53 support the first and second transmissive members 54 and 55. More specifically, the first transmissive member 54 is supported by the first and second support members 51 and 52, and the second transmissive member 55 is supported by the second and third support members 52 and 53. In other words, the first to third support members 51, 52, and 53 are arranged in the stated order from a front side to a rear side. The second support member 52 is located between the first transmissive member 54 and the second transmissive member 55 and functions as a connection member for connecting those members 52 and 53 to each other. In this example, a length of the first transmissive member 54 and the second transmissive member 55 in the front-rear direction defines a vertical dimension of the virtual image 27 visually recognized by the driver. In other words, as the length of the first and second transmissive members 54 and 55 in the front-rear direction increases more, the vertical dimension in which the driver views the virtual image 27 increases more. On the contrary, as the length of the first and second transmissive members 54 and 55 in the front-rear direction decreases more, the vertical dimension in which the driver views the virtual image 27 decreases more.

When entering the field of vision of the user, the light beam that has been transmitted through the first transmissive member 54 appears below the light beam that has been transmitted through the second transmissive member 55. That is, in FIG. 2, the driver recognizes the light beam transmitted through the front side as a lower light beam, and recognizes the light beam transmitted through the rear side as an upper light beam.

The first transmissive member 54 and the second transmissive member 55 have substantially the same cross-sectional shape. That is, the first transmissive member 54 has a shape extending upward (becoming higher) from the front end to the rear end. Similarly, the second transmissive member 55 has a shape extending upward (becoming higher) from the front end to the rear end. More specifically, the first transmissive member 54 has a downwardly protruding curved surface that curves upward while increasing in slope from the front end toward the rear end. Likewise, the second transmissive member 55 has a downwardly protruding curved surface that curves upward while increasing in slope from the front end toward the rear end. Accordingly, the front ends of the first and second transmissive members 54 and 55 are located at the lowermost sides of the first and second transmissive members 54 and 55, respectively, and the rear ends of the first and second transmissive members 54 and 55 are located at the uppermost sides of the first and second transmissive members 54 and 55, respectively. As illustrated in FIG. 2, when the first transmissive member 54 and the second transmissive member 55 are regarded as one member, the cross-sectional shape of the first transmissive member 54 and the second transmissive member 55 is discontinuous at the rear end of the first transmissive member 54 and the front end of the second transmissive member 55. In the following description, a discontinuous portion formed by the rear end of the first transmissive member 54 and the front end of the second transmissive member 55 may be referred to as a discontinuous portion 521.

Further, as illustrated in FIG. 2, an angle $\gamma 1$ defined by a tangential plane P1 at the rear end of the first transmissive member 54 in the front-rear direction is set to be larger than an angle $\gamma 2$ defined by a tangential plane P2 at the front end of the second transmissive member 55 in the front-rear direction. In other words, a gradient of the rear end of the first transmissive member 54 with respect to the front-rear direction is set to be larger than that of the front end of the second transmissive member 55 with respect to the front-rear direction.

Furthermore, in the first embodiment, the rear end of the first transmissive member 54 is offset upward of the front end of the second transmissive member 55. That is, the rear end of the first transmissive member 54 and the front end of the second transmissive member 55 are vertically displaced from each other.

The second support member 52 is configured by a light shielding member that suppresses the transmission of light. In the present embodiment, a light shielding ratio of a visible light by the second support member 52 is 100%. However, the second support member 52 may have a light shielding ratio of the visible light (for example, 99% or more) that does not affect a field of vision of a person.

The first support member 51 is provided with a light shielding wall a. The light shielding wall 51a protrudes upward from a connecting portion 520 of the first support member 51 with the first transmissive member 54. In FIG. 2, a plane passing through a visual line position of the driver and an upper end of the light shielding wall 51a (an upper end portion of the first support member 51) is indicated by a broken line as a visual line lower end plane. Further, an angle defined between a center of the virtual image 27 and the support lower end plane is indicated by $\beta 3$.

The light shielding wall 51a is irradiated with a reflected light of an external light reflected by the first transmissive member 54. The light shielding wall 51a absorbs the reflected light and restrains a portion such as the windshield 21 having an adverse influence on the driver's field of view from being irradiated with the reflected light of the external light.

In this example, the image generation controller 10 generates an image so that a region including the rear end of the first transmissive member 54 and the front end of the second transmissive member 55 in the first and second transmissive members 54 and 55 installed in the cover member 40 falls within a non-display region 92 of the generated image. In other words, the image generation controller 10 sets the non-display region 92 in which the image is not displayed, in an area substantially coinciding with a region shadowed by the second support member 52.

Effects of the Present Embodiment

As described in detail above, the head-up display 1 includes the image generation unit 5 that generates the image to be displayed on the display unit, the cover member 40 that covers the image generation unit 5, and the image generation controller 10 that causes the image generation unit 5 to generate the image. The image generation controller 10 generates the image so that the region (discontinuous portion 521) including the rear end of the first transmissive member 54 and the front end of the second transmissive member 55 provided in the cover member falls within the non-display region of the image to be generated.

According to the head-up display 1 described above, since the region including the discontinuous portion 521 which is unlikely to display the image is set as the non-display region of the image, an image with reduced discomfort to the user can be provided.

In addition, in the head-up display 1, a cover member 40 includes the first and second transmissive members 54 and 55 that transmit the light beam including the image generated by the image generation unit 5, and the first to third support members 51, 52, and 53 that support the first and second transmissive members 54 and 55. The first and second transmissive members 54 and 55 are formed to face upward from the front side to the rear side.

In addition, the discontinuous portion 521 is formed in the first and second transmissive members 54 and 55 at the rear end of the first transmissive member 54 and the front end of the second transmissive member 55. The angle $\gamma 1$ defined by a tangential plane P1 at the rear end of the first transmissive member 54 with respect to the front-rear direction is set to be larger than an angle $\gamma 2$ defined by a tangential plane P2 at the front end of the second transmissive member 55 with respect to the front-rear direction. The rear end of the first transmissive member 54 is offset to an upper side from the front end of the second transmissive member 55.

Figure 15:
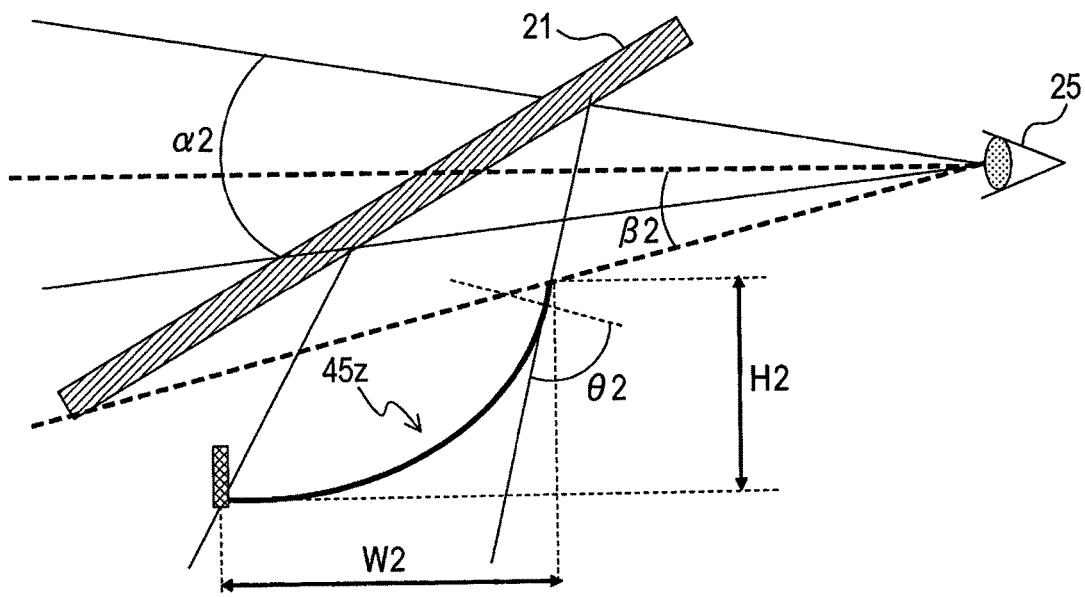
FIG. 15 is a side view of a head-up display including a light transmissive portion according to a reference example.

Therefore, according to the head-up display 1 of the first embodiment, a height of the entire cover member can be suppressed as compared with the cover member (the height of the light transmissive portion 45z in the cover member illustrated in FIG. 15) of the reference example described above. Further, a viewing angle of the image in the up-down direction (an angle of α3 in FIG. 2 etc.) can be increased while suppressing the height of the entire cover member.

In addition, the first and second transmissive members 54 and 55 each have the downwardly protruding curved surface that curves upward while increasing in slope from the front end toward the rear end. In other words, the angle defined by the tangential plane at the front end of the first transmissive member 54 with respect to the front-rear direction is set to be smaller than the angle γ1 defined by the tangential plane P1 at the rear end of the first transmissive member 54 with respect to the front-rear direction. Likewise, the angle defined by the tangential plane at the front end of the second transmissive member 55 with respect to the front-rear direction is set to be smaller than the angle γ2 defined by the tangential plane P2 at the rear end of the second transmissive member 55 with respect to the front-rear direction.

According to the head-up display 1 described above, when the external light is applied to the first and second transmissive members 54 and 55, the reflected light reflected by the first and second transmissive members 54 and 55 is unlikely to enter the user's field of vision.

The rear end of the first transmissive member 54 is located at an upper side of the front end of the second transmissive member 55. The second support member 52 that connects the rear end of the first transmissive member 54 and the front end of the second transmissive member 55 to each other is provided.

According to the head-up display 1 described above, the height of the entire cover member can be effectively suppressed.

Further, in the head-up display 1, the second support member 52 is formed of a light shielding member.

According to the head-up display 1 described above, the external light reflected by the first and second transmissive members 54 and 55 can be restrained from entering the user's field of vision.

Second Embodiment

Next, a head-up display according to a second embodiment will be described. In the description of the present embodiment and following embodiments, only portions different from the head up display 1 of the first embodiment will be described in detail, and portions similar to those of the head-up display 1 of the first embodiment will be denoted by the same reference numerals and will be omitted from the description.

Figure 3:
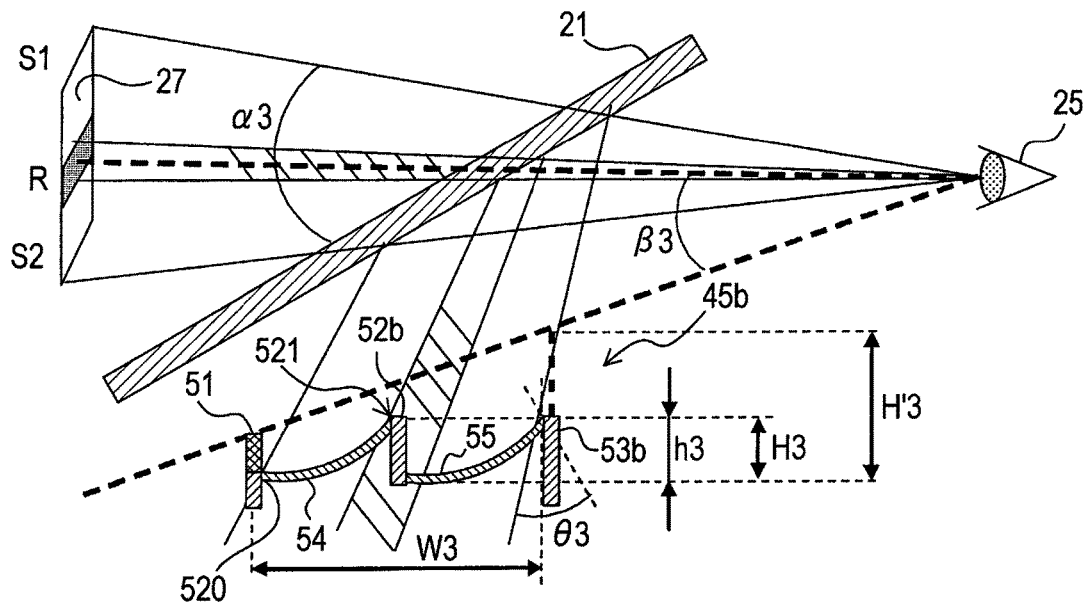
FIG. 3 is a side view of a head-up display including a light transmissive portion according to a second embodiment.

As illustrated in FIG. 3, in a light transmissive portion 45b, attention is paid to a height h3 of a second support member 52 when any lower side of a lower surface of a front end of a second transmissive member 55 and a lower surface of a connecting portion 520 of a first support member 51 with the front end of a first transmissive member 54 is set as a reference plane. In addition, attention is paid to a height H3 of a third support member 53 to the reference surface. In the present embodiment, the lower surface of the front end of the second transmissive member 55 is located below the connecting portion 520, and the lower surface of the front end of the second transmissive member 55 is set as the reference surface. Also, the reference surface is set as a plane perpendicular to a height direction (that is, a horizontal plane).

As illustrated in FIG. 2, the height H3 of the third support member 53 is larger than the height h3 of the second support member 52 in the light transmissive portion 54a according to the first embodiment whereas as illustrated in FIG. 3, the heights h3 and H3 of the second and third support members 52 and 53 are substantially the same in the light transmissive portion 45b according to the second embodiment. That is, in a cover member 40, the height positions of the rear end of the first transmissive member 54 and the rear end of the second transmissive member 55 are configured to substantially coincide with each other. However, the height positions of the rear end of the first transmissive member 54 and the rear end of the second transmissive member 55 do not necessarily have to perfectly coincide with each other, but may be slightly different in height position.

According to the head-up display described above, the height of the entire cover member 40 can be minimized. The heights h3 and H3 of the first and second support members 52 and 53 are preferably set so as not to exceed the visual line lower end plane so as not to affect the field of vision of the driver.

Third Embodiment

Figure 4:
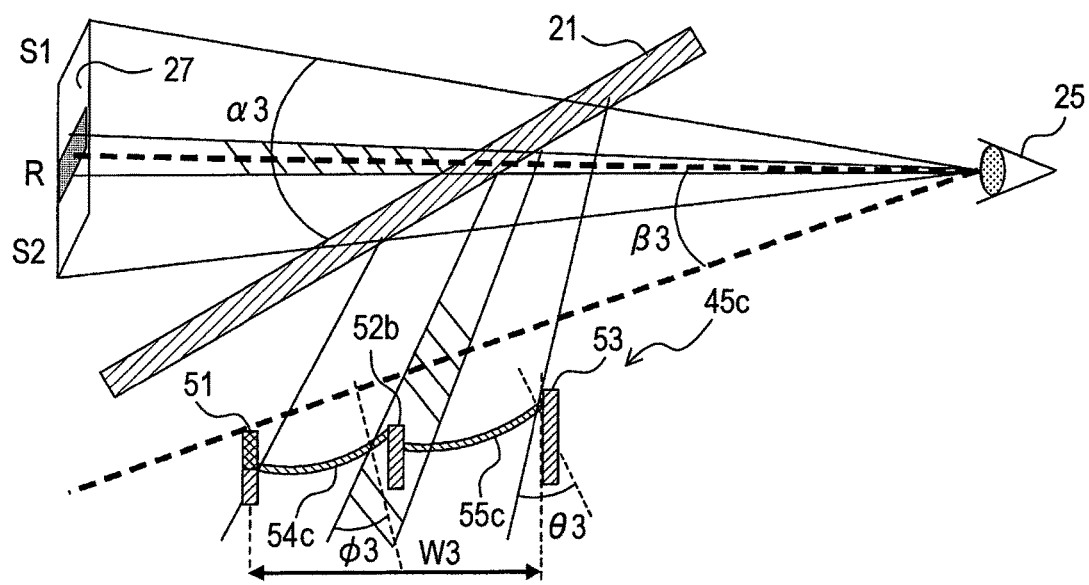
FIG. 4 is a side view of a head-up display including a light transmissive portion according to a third embodiment.

In a head-up display according to a third embodiment, a transmittance of a light beam is designed to be kept substantially constant in a light transmissive portion 45c. More specifically, as illustrated in FIG. 4, first and second transmissive members 54c and 55c of the light transmissive portion 45c are configured such that incident angles when a light beam including an image generated by an image generation unit 5 enters the respective first and second transmissive members 54c and 55c are kept substantially constant.

That is, when an image reflected on a reflecting mirror 18 reaches the first and second transmissive members 54c and 55c through a concave mirror 15, since a light beam is enlarged toward a windshield 21, an angle of the light beam differs little by little according to a position of the light beam that is transmitted through the first and second transmissive members 54c and 55c (refer to FIG. 1). For that reason, the first and second transmissive members 54c and 55c are curved according to a difference in angle whereby an incident angle when the light beam enters the first and second transmissive members 54c and 55c is kept roughly constant.

The incident angle to the first transmissive member 54c is kept substantially constant at ϕ3 at any position and the incident angle to the second transmissive member 55c is kept substantially constant at θ3 at any position. However, the incident angles ϕ3 and θ3 when the light beam enters the first and second transmissive members 54c and 55c, respectively, not only are kept strictly constant at all positions but also may be somewhat different from each other. Furthermore, in the present embodiment, a value of the incident angle ϕ3 to the first transmissive member 54c and a value of the incident angle θ3 to the second transmissive member 55c are set to be approximately the same. However, not only when the incident angle ϕ3 and the incident angle θ3 are strictly the same but also the incident angle ϕ3 and the incident angle θ3 may be slightly different from each other.

According to a cover member 40 described above, the incident angle when the light beam including the image enters the first and second transmissive members 54c and 55c is kept substantially constant for each of the first and second transmissive members 54c and 55c. Accordingly, the transmittance of light of the first and second transmissive members 54c and 55c can be kept substantially constant for each section.

Further, since the first and second transmissive members 54c and 55c are configured so that the incident angles are kept substantially equal to each other in the cover member 40, the transmittance of light in the first and second transmissive members 54c and 55c can be kept substantially constant regardless of the position.

In the present embodiment, it is sufficient that the respective incident angles of the first and second transmissive members 54c and 55c are kept substantially constant. In other words, the incident angle φ3 to the first transmissive member 54c and the incident angle θ3 to the second transmissive member 55c may have different values from each other.

Fourth Embodiment

Figure 5:
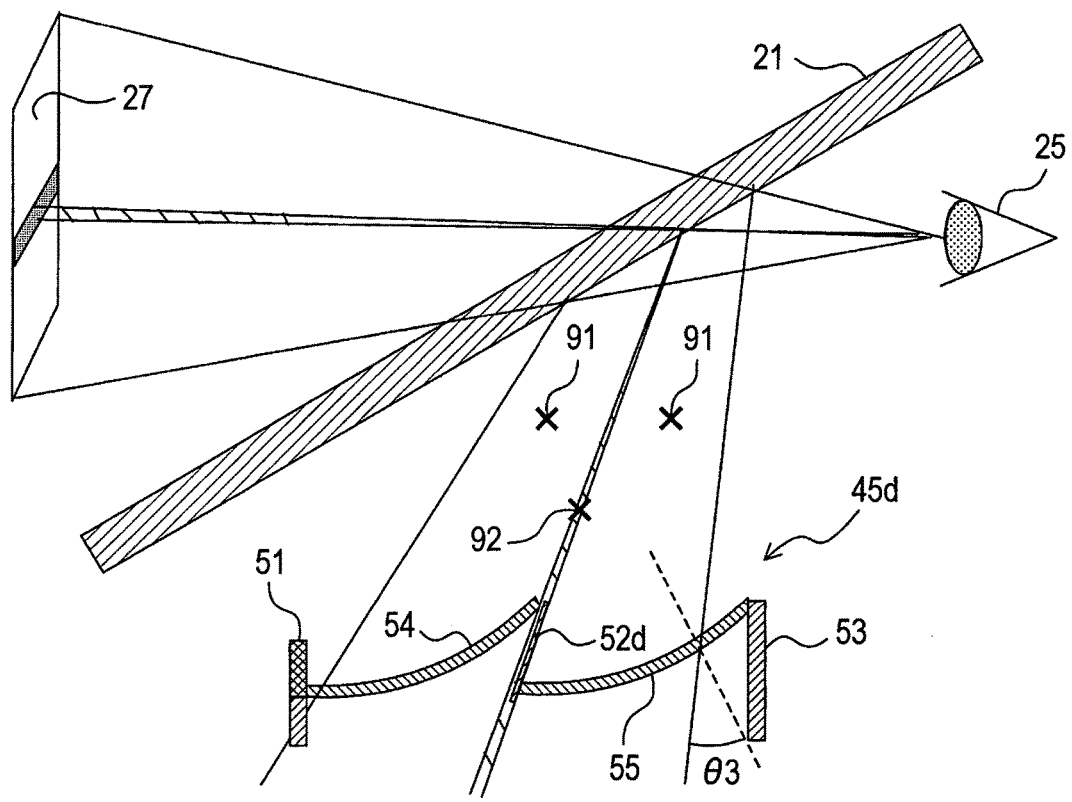
FIG. 5 is a side view of a head-up display including a light transmissive portion according to a fourth embodiment.

In a head-up display according to a fourth embodiment, a non-display region 92 in which no image is displayed is designed to be narrowed as much as possible in a light transmissive portion 45d. More specifically, as illustrated in FIG. 5, a second support member 52d of a cover member 40 is shaped in a flat plate. Further, the second support member 52d is disposed so as to be substantially parallel to a direction of a light beam passing in the vicinity of a position where the second support member 52d is provided. It should be noted that the second support member 52d may not only be strictly parallel to the light beam passing in the vicinity of the position where the second support member 52d is provided but also may be slightly inclined with respect to the light beam.

According to the head-up display described above, since the region shadowed by the second support member 52d (that is, an area where light beam cannot pass through) can be narrowed, an influence on the driver's vision can be reduced.

Fifth Embodiment

Figure 6:
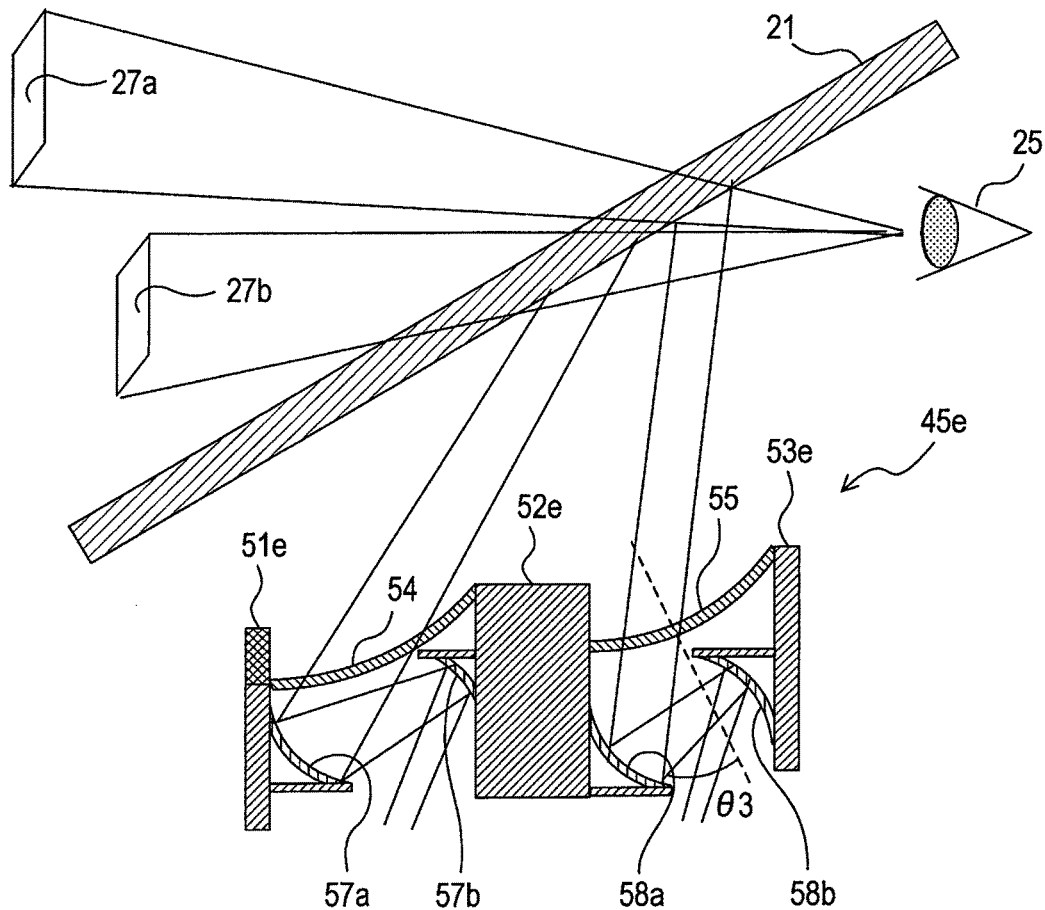
FIG. 6 is a side view of a head-up display including a light transmissive portion according to a fifth embodiment.

In a head-up display according to a fifth embodiment, optical members configuring an image generation unit 5 are disposed in a light transmissive portion 45e. More specifically, as illustrated in FIG. 6, each of first to third support members 51e, 52e, and 53e is formed of a beam member that holds first and second transmissive members 54 and 55. At least a part of optical members 57a, 57b, 58a, and 58b which are parts of an optical system, such as a mirror and a lens configuring the image generation unit 5, are disposed in the first to third support members 51e, 52e, and 53e. More specifically, the optical members 57a and 57b corresponding to the first transmissive member 54 are provided between the first and second support members 51e and 52e. In addition, the optical members 58a, 58b corresponding to the second transmissive member 55 are provided between the second and third support members 52e and 53e.

According to the head-up display described above, the light beams for separate images 27a and 27b are transmitted through the first and second transmissive members 54 and 55 so that the respective images 27a and 27b can be visually recognized by the driver.

In addition, according to the head-up display described above, a space generated in a cover member 40 can be effectively used.

Sixth Embodiment

Figure 7:
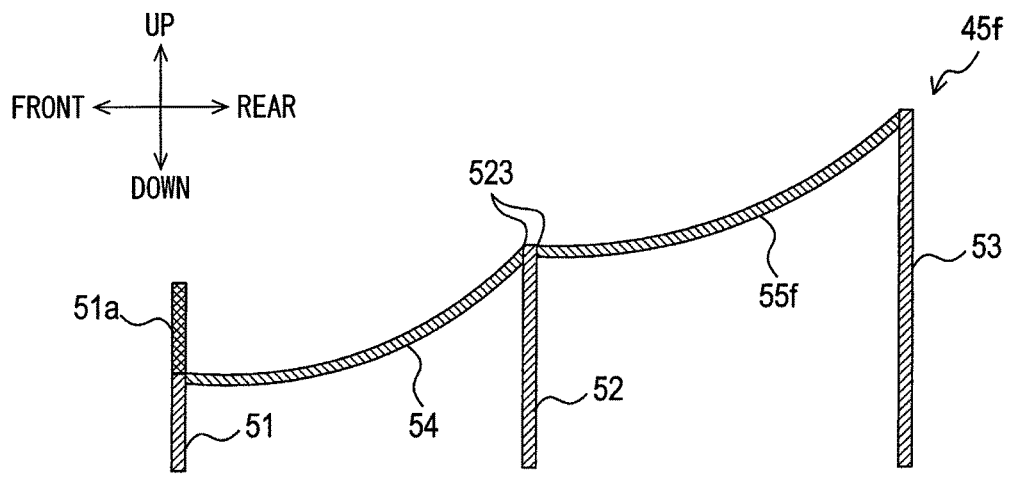
FIG. 7 is a side view of a head-up display including a light transmissive portion according to a sixth embodiment.

In a head-up display according to a sixth embodiment, as illustrated in FIG. 7, in a light transmissive portion 45f, a rear end of a first transmissive member 54 and a front end of a second transmissive member 55f are connected to each other at an inflection point 523 (a connecting portion through a second support member 52). At the inflection point 523, the positions of the rear end of the first transmissive member 54 and the front end of the second transmissive member 55f are substantially aligned with each other in a height direction. For that reason, there is no step in the up-down direction as illustrated in the first embodiment between the rear end of the first transmissive member 54 and the front end of the second transmissive member 55f. When the first transmissive member 54 and the second transmissive member 55f are regarded as one member, the cross-sectional shape of the first transmissive member 54 and the second transmissive member 55f is discontinuous at the connecting portion of the rear end of the first transmissive member 54 and the front end of the second transmissive member 55f.

Even with the head-up display described above, the height of a cover member 40 can be suppressed as compared with the case where the transmissive members are formed of one member. When the rear end of the first transmissive member 54 and the front end of the second transmissive member 55f can be firmly connected to each other, the second supporting member 52 may not be provided.

Seventh Embodiment

In a head-up display according to a seventh embodiment, a light transmissive portion 45g has a configuration for displaying an image different from an image generated by an image generation unit 5 in a region that serves as a non-display region 92.

Figure 8:
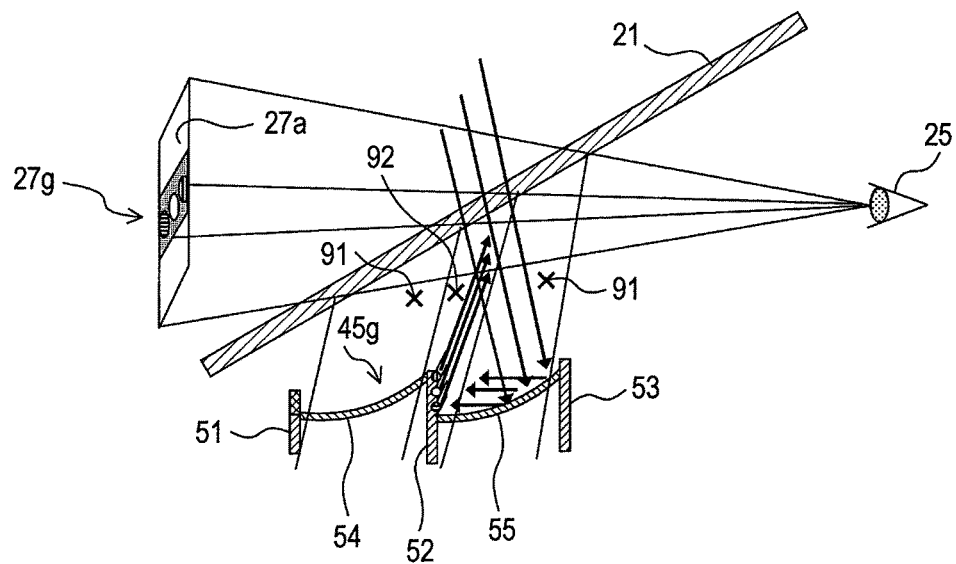
FIG. 8 is a side view of a head-up display including a light transmissive portion according to a seventh embodiment.
Figure 9:
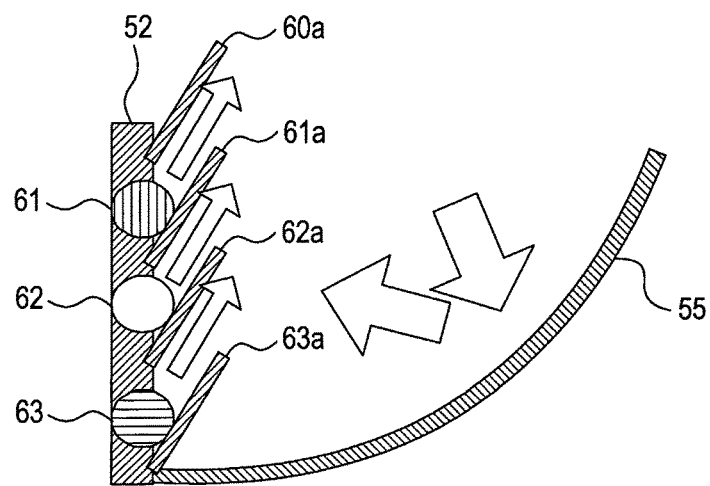
FIG. 9 is an enlarged view of the light transmissive portion.

More specifically, as illustrated in FIGS. 8 and 9, the light transmissive portion 45g includes light emitting portions 61, 62, 63 and light shielding portions 61a, 62a, and 63a. The light emitting portion 61, 62, and 63 are disposed on a rear side of a second support member 52, and emit light beams different from the light beam including the image generated by the image generation unit 5 in a direction of the light beam including the image.

The light shielding portions 61a, 62a, and 63a are disposed on a rear side of the second support member 52 further than the light emitting portions 61, 62, and 63. The light shielding portions 61a, 62a, and 63a are disposed so as to be substantially parallel to a direction in which the light beam including the image generated by the image generation unit 5 passes through the first and second transmissive members 54 and 55.

That is, the light shielding portions 61a, 62a, and 63a transmit the light beams (refer to thin arrows in FIG. 9) emitted from the light emitting portions 61, 62, and 63 to a windshield 21 without shielding while absorbing an external light reflected by the second transmissive member 55 (ref to thick arrows in FIG. 9). As a result, the light shielding portions 61a, 62a, and 63a restrain the light emitting portions 61, 62, and 63 from being irradiated with the external light and restrain the external light from being reflected to a portion having an influence on the driver's vision.

According to the head-up display described above, since the light emitting portions 61, 62, and 63 are provided on the second support member 52, even in the region where the image cannot be displayed due to the presence of the second support member 52 (non-display region 92), some kind of display can be performed. Further, since the light shielding portions 61a, 62a, and 63a are provided on the second support member 52, the external light reflected by the first and second transmissive members 54 and 55 can be restrained from entering the light emitting portions 61, 62, and 63.

Eighth Embodiment

Figure 10:
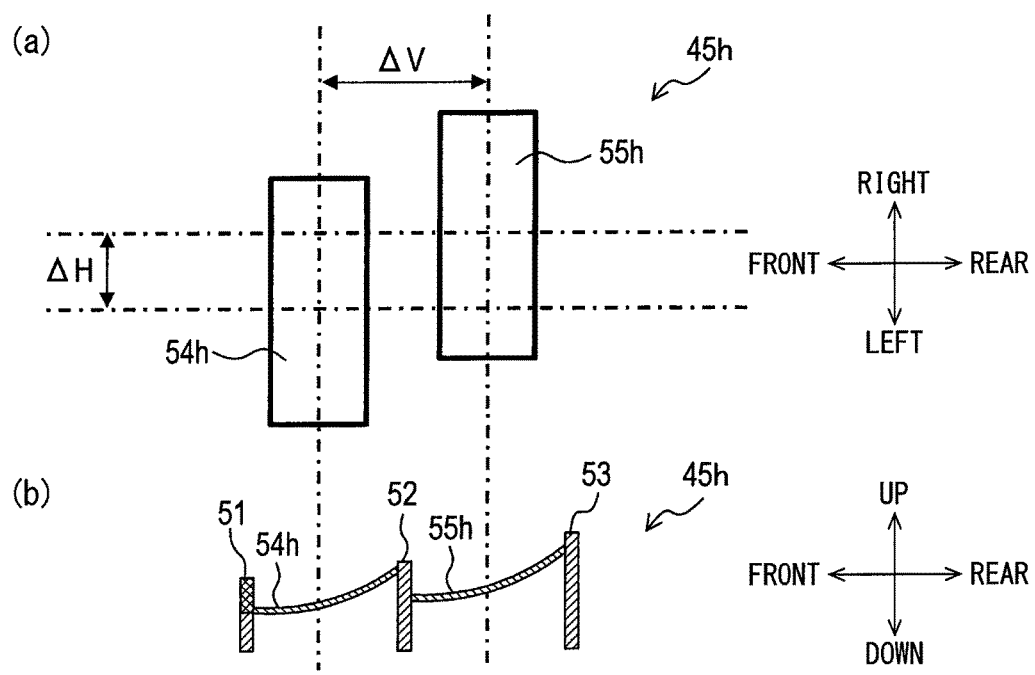
FIGS. 10(a) and (b) are illustrative views illustrating a light transmissive portion according to an eighth embodiment, in which (a) is a top view of the light transmissive portion and (b) is a side cross-sectional view of the light transmissive portion.

In a head-up display according to an eighth embodiment, as illustrated in FIGS. 10A and 10B, in a light transmissive portion 45h, a first transmissive member 54h and a second transmissive member 55h are offset in a left-right direction.

In an example illustrated in FIG. 10A, the first transmissive member 54h is offset to the left with respect to the second transmissive member 55h. Assuming that an offset amount in the left-right direction in this situation is ΔH and an offset amount of center coordinates in a front-rear direction of the first and second transmissive members 54h and 55h is ΔV, it is preferable that a relationship of |ΔV|>|ΔH|≥0 is satisfied. As a result, an increase in the size of the head-up display can be suppressed.

Figure 11:
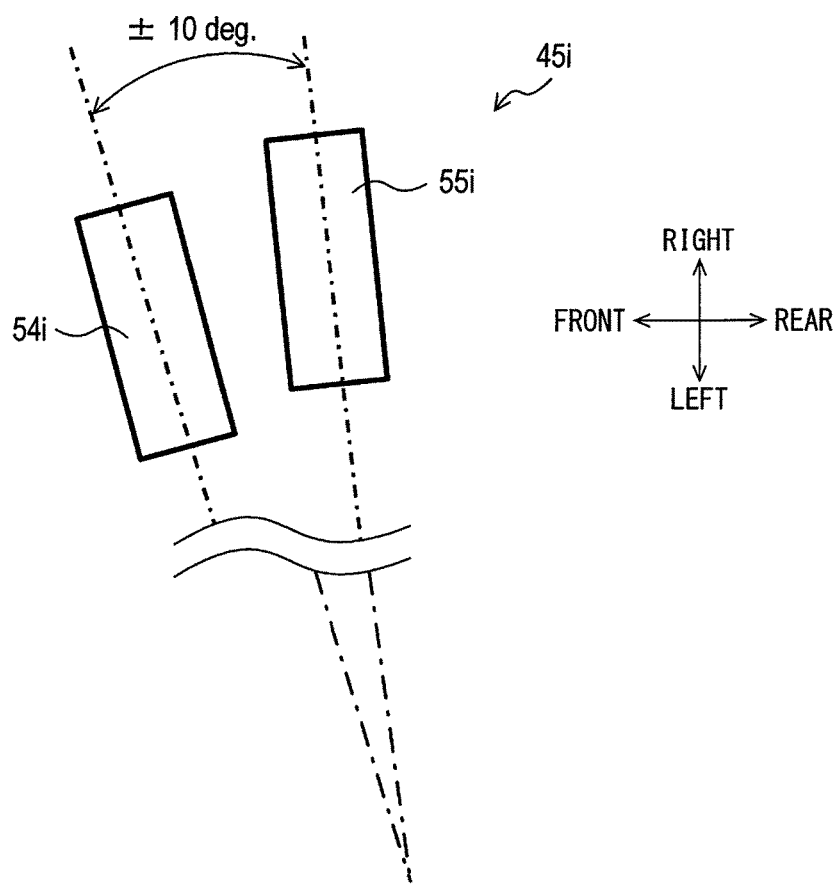
FIGS. 11(a) and (b) are illustrative views illustrating a light transmissive portion according to a modification of the eighth embodiment, in which (a) is a top view of the light transmissive portion and (b) is a side cross-sectional view of the light transmissive portion.
Figure 11:
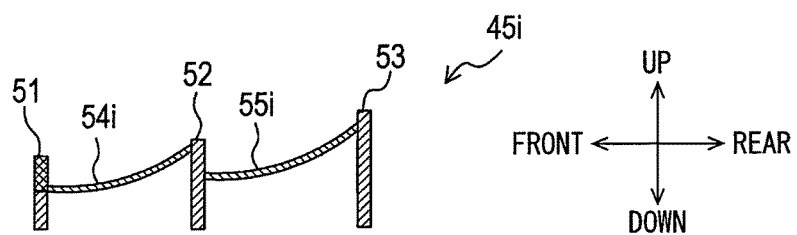

Further, a light transmissive portion 45i illustrated in FIG. 11A and FIG. 11B may be employed. That is, each of first and second transmissive members 54i and 55i may have a predetermined angle with respect to the left-right direction.

In this case, an angular difference of the first and second transmissive members 54i and 55i in a horizontal plane is preferably in a range of about 10 degrees. It is more preferable that the angular difference matches a shape of distortion of the image generated by the image generation unit 5.

Furthermore, according to the head-up display described above, the same effects as those in the configuration of the above embodiments can be obtained.

Ninth Embodiment

In a head-up display according to a ninth embodiment, in a light transmissive portion 45g, first and second transmissive members 54j and 55j each have a contour following an contour of an image which is generated by an image generation unit 5 and passes through the first and second transmissive members 54j and 55j.

Figure 12:
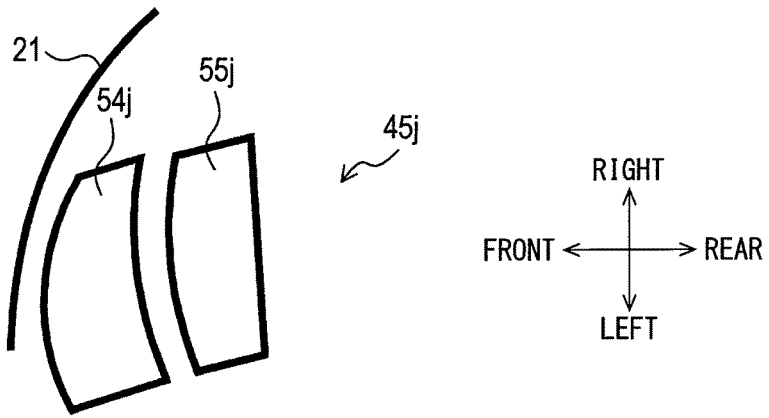
FIG. 12 is an illustrative top view of a light transmissive portion according to a ninth embodiment.

For example, as illustrated in FIG. 12, the shapes of the first and second transmissive members 54j and 55j are set to be curved according to the shape of the distortion of the image generated by the image generation unit 5. In this case, if the shapes of the first and second transmissive members 54j and 55j and a housing 35 also match a shape of a windshield 21, the housing 35 can be disposed with less space. That is, regions required for the first and second transmissive members 54j and 55j are effectively used.

Other Embodiments

The present disclosure are not interpreted with the limit by the above embodiments. Symbols used for description of the above embodiments are also appropriately used in the claims, but used for the purpose of facilitating the understanding of the invention according to the respective claims, and are not intended to limit the technical scopes of the invention according to the respective claims. In addition, a function of one constituent element in the above-described embodiments may be distributed to a plurality of constituent elements, or functions of a plurality of constituent elements may be integrated into one constituent element. In addition, at least a part of the above-described embodiments may be switched to a known configuration having similar effects. In addition, a portion of the configuration in the above-described embodiment may be omitted so far as the problem can be solved. Also, at least a part of the configuration in the above embodiments may be added to or replaced with another configuration in the above embodiments. In addition, all aspects that are included in the technical spirit that is specified in the attached claims are embodiments of the present disclosure.

In addition to the head-up display described above, the present invention can be realized in various forms such as a system using the head-up display as a component.

Figure 13:
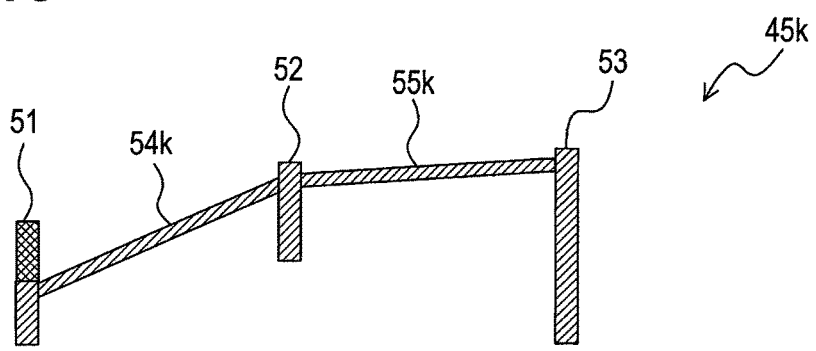
FIG. 13 is a side view illustrating a light transmissive portion according to one modification.
Figure 14:
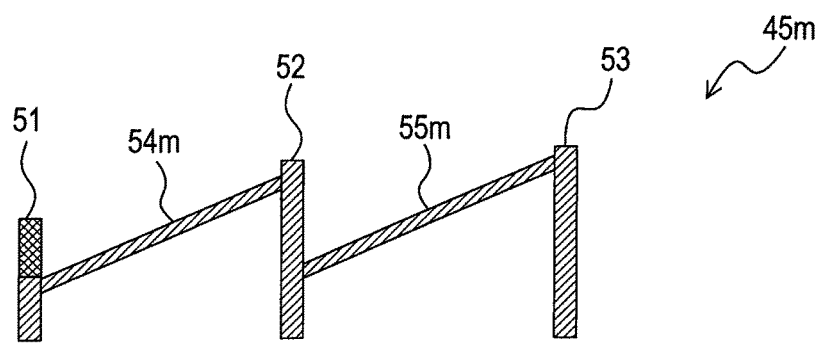
FIG. 14 is a side view illustrating a light transmissive portion according to another modification.

For example, in the cover member 40 of the above embodiments, the first and second transmissive members 54 and 55 have been described as having curved surfaces. Alternatively, the first and second transmissive members may be shaped in a flat plate, and both of the transmissive members may be connected to each other in the discontinuous portion 521. For example, as illustrated in FIG. 13, the first and second transmissive members 54k and 55k are connected to each other without steps in the up-down direction, and the angle defined by the tangential plane at the rear end of the first transmissive member 54k with respect to the front-rear direction may be set to be larger than the angle defined by the tangent plane at the front end of the second transmissive member 55k with respect to the front-rear direction. In this way, when the first and second transmissive members 54k and 55k are shaped in the flat plate, the "tangential plane" is a plane parallel to the first and second transmissive members 54d and 55k. Alternatively, as illustrated in FIG. 14, there is a step in the up-down direction at the connecting portion of first and second transmissive members 54m and 55m, and the inclination angle of the first and second transmissive members 54m and 55m may be set to an arbitrary gradient, for example, the same value, or the first and second transmissive members 54m and 55m may have an arbitrary shape.

According to the head-up display according to the above modification, since the first and second transmissive members 54k, 55k, 54m, and 55m are formed of the flat plates, a material of the first and second transmissive members 54k, 55k, 54m, and 55m can be made of a general-purpose product. In addition, an increase in size of the first and second transmissive members 54k, 55k, 54m, and 55m can be suppressed and a yield can be improved.

What is claimed is:

1. A head-up display cover member that covers from an upper side an image generation unit for generating an image viewed as a virtual image on a front side of a user, the cover member comprising:
   an upper wall;
   a first transmissive member that transmits a light beam including the image generated by the image generation unit; and
   a second transmissive member that is disposed on a rear side of the first transmissive member and transmits the light beam including the image generated by the image generation unit, wherein
   the first transmissive member and the second transmissive member are disposed within a same opening formed in the upper wall,
   the first transmissive member is shaped to face upward from a front end to a rear end,
   the second transmissive member is shaped to face upward from a front end to a rear end, and an angle defined by a slope at the rear end of the first transmissive member with respect to a front-rear direction is set to be larger than an angle defined by a slope at the front end of the second transmissive member with respect to the front-rear direction, or the rear end of the first transmissive member is offset to an upper side of the front end of the second transmissive member.

2. The head-up display cover member according to claim 1, wherein
the first transmissive member has a curved surface that protrudes downward and curves upward while increasing in slope from the front end toward the rear end, and
the second transmissive member has a curved surface that protrudes downward and curves upward while increasing in slope from the front end toward the rear end.

3. The head-up display cover member according to claim 1, wherein
the first transmissive member is formed in a plate shape that is inclined upward from the front end toward the rear end, and
the second transmissive member is formed in a plate shape that is inclined upward from the front end toward the rear end.

4. The head-up display cover member according to claim 1, wherein
the rear end of the first transmissive member and the rear end of the second transmissive member are substantially aligned with each other in an up-down direction.

5. The head-up display cover member according to claim 1, wherein
the first transmissive member is configured to keep substantially constant an incident angle defined when receiving the light beam including the image generated by the image generation unit, and
the second transmissive member is configured to keep substantially constant an incident angle defined when receiving the light beam including the image generated by the image generation unit.

6. The head-up display cover member according to claim 5, wherein
the incident angle of the first transmissive member and the incident angle of the second transmissive member are configured to substantially match each other.

7. The head-up display cover member according to claim 1, wherein
the rear end of the first transmissive member is offset to an upper side with respect to the front end of the second transmissive member, and
the rear end of the first transmissive member is coupled with the front end of the second transmissive member through a support member.

8. The head-up display cover member according to claim 7, wherein
the support member comprises a light shielding member.

9. The head-up display cover member according to claim 7, wherein
the support member is shaped in a flat plate shape, and
the support member is disposed in parallel to a direction of the light beam that passes through a position at which the support member is disposed.

10. The head-up display cover member according to claim 7, wherein
the support member is provided with at least a part of optical members configuring the image generation unit.

11. The head-up display cover member according to claim 7, further comprising:
a light emitting portion that is disposed at the second transmissive member side of the support member and emits a light beam different from the light beam including the image generated by the image generation unit in a direction of the light beam including the image; and
a light shielding portion that is disposed on the second transmissive member side of the support member substantially in parallel to a direction in which the light beam including the image passes through the second transmissive member.

12. The head-up display cover member according to claim 1, wherein
the image generation unit is configured to generate an image that passes through the first transmissive member and the second transmissive member, the generated image having a contour matching contours of the first transmissive member and the second transmissive member.

13. A display device for a head-up display, comprising:
an image generation unit that generates an image to be displayed on a display unit;
the head-up display cover member according to claim 1; and
an image generation controller that causes the image generation unit to generate an image.

14. The display device according to claim 13, wherein
the image generation controller generates an image such that an area including the rear end of the first transmissive member and the front end of the second transmissive member in the head display cover member is a non-display region of the image to be generated.

15. The head-up display cover member according to claim 1, wherein
the first transmissive member includes a first light reception surface that faces downward,
the second transmissive member includes a second light reception surface that faces downward,
the slope at the rear end of the first transmissive member is a slope of the first light reception surface, and
the slope at the front end of the second transmissive member is a slope of the second light reception surface.

16. The head-up display cover member according to claim 1, wherein
the first transmissive member and the second transmissive member are separately provided cover elements.

17. The head-up display cover member according to claim 1, wherein
the rear end of the first transmissive member is connected to the front end of the second transmissive member through a support member.

18. A head-up display cover member that covers from an upper side an image generation unit for generating an image viewed as a virtual image on a front side of a user, the cover member comprising:
a first transmissive member that transmits a light beam including the image generated by the image generation unit;
a second transmissive member that is disposed on a rear side of the first transmissive member and transmits the light beam including the image generated by the image generation unit, wherein
the first transmissive member is shaped to face upward from a front end to a rear end,
the second transmissive member is shaped to face upward from a front end to a rear end, an angle defined by a tangential plane at the rear end of the first transmissive member with respect to a front-rear direction is set to be larger than an angle defined by a tangential plane at the front end of the second transmissive member with respect to the front-rear direction, or the rear end of the first transmissive member is offset to an upper side of the front end of the second transmissive member, the first transmissive member has a curved surface that protrudes downward and curves upward while increasing in slope from the front end toward the rear end, the second transmissive member has a curved surface that protrudes downward and curves upward while increasing in slope from the front end toward the rear end, and the rear end of the first transmissive member is coupled with the front end of the second transmissive member through a support member;

a light emitting portion that is disposed at the second transmissive member side of the support member and emits a light beam different from the light beam including the image generated by the image generation unit in a direction of the light beam including the image; and a light shielding portion that is disposed on the second transmissive member side of the support member substantially in parallel to a direction in which the light beam including the image passes through the second transmissive member.

19. A head-up display cover member that covers from an upper side an image generation unit for generating an image viewed as a virtual image on a front side of a user, the cover member comprising:

a first transmissive member that transmits a light beam including the image generated by the image generation unit;

a second transmissive member that is disposed on a rear side of the first transmissive member and transmits the light beam including the image generated by the image generation unit, wherein the first transmissive member is shaped to face upward from a front end to a rear end, the second transmissive member is shaped to face upward from a front end to a rear end, an angle defined by a slope at the rear end of the first transmissive member with respect to a front-rear direction is set to be larger than an angle defined by a slope at the front end of the second transmissive member with respect to the front-rear direction, or the rear end of the first transmissive member is offset to an upper side of the front end of the second transmissive member, the first transmissive member is formed in a plate shape that is inclined upward from the front end toward the rear end, the second transmissive member is formed in a plate shape that is inclined upward from the front end toward the rear end, and the rear end of the first transmissive member is coupled with the front end of the second transmissive member through a support member;

a light emitting portion that is disposed at the second transmissive member side of the support member and emits a light beam different from the light beam including the image generated by the image generation unit in a direction of the light beam including the image; and a light shielding portion that is disposed on the second transmissive member side of the support member substantially in parallel to a direction in which the light beam including the image passes through the second transmissive member.

* * * * *